United States Patent [19]

Yu et al.

[11] Patent Number: 5,410,693
[45] Date of Patent: Apr. 25, 1995

[54] METHOD AND APPARATUS FOR ACCESSING A DATABASE

[75] Inventors: Hong-Lee Yu, Woodinville; Thomas C. Mitchell; Albert J. Nicholes, Jr., both of Redmond, all of Wash.

[73] Assignee: Wall Data Incorporated, Palo Alto, Calif.

[21] Appl. No.: 188,304

[22] Filed: Jan. 26, 1994

[51] Int. Cl.6 .............................................. G06F 15/40
[52] U.S. Cl. .............................. 395/600; 364/DIG. 1; 395/700
[58] Field of Search ............... 395/600, 650, 800, 725, 395/575; 364/200

[56] References Cited

U.S. PATENT DOCUMENTS

| | | | |
|---|---|---|---|
| 4,751,635 | 6/1988 | Kret | 395/600 |
| 4,799,153 | 1/1989 | Hann et al. | 395/325 |
| 4,956,769 | 9/1990 | Smith | 395/600 |
| 5,113,499 | 5/1992 | Ankney et al. | 395/325 |
| 5,239,648 | 8/1993 | Nukui | 395/600 |
| 5,261,102 | 11/1993 | Hoffman | 395/600 |
| 5,263,157 | 11/1993 | Janis | 395/600 |
| 5,263,158 | 11/1993 | Janis | 395/600 |
| 5,263,167 | 11/1993 | Conner, Jr. et al. | 395/700 |
| 5,317,742 | 5/1994 | Bapat | 395/700 |

*Primary Examiner*—Thomas G. Black
*Assistant Examiner*—Cuan Pham
*Attorney, Agent, or Firm*—Christensen, O'Connor, Johnson & Kindness

[57] ABSTRACT

A method and apparatus for improving the efficiency and security of a database management system (DBMS) is disclosed. A plurality of query packages are stored at a host DBMS. Generation of the query packages is limited only to those users that have authorization, such as the database administrator of the DBMS. The query packages include a plurality of procedures. Each procedure is a single SQL statement that has been pre-compiled. Each query package also includes an authorization table that enumerates each individual user, or category of user, that can invoke any procedure within the query package. By formulating a plurality of query packages, each package tailored to a particular category of user, security of the data on the DBMS is enhanced. Further, by having static statements that are pre-compiled, access time to the data on the DBMS is significantly reduced. Moreover, the database administrator and users can interactively generate and use the query packages in a user friendly environment.

11 Claims, 11 Drawing Sheets

METHOD AND APPARATUS FOR ACCESSING A DATABASE

TECHNICAL AREA/FIELD OF THE INVENTION

The present invention is directed towards database management systems and, more particularly, to an improved method and apparatus for accessing information stored in a database management system.

BACKGROUND OF THE INVENTION

Databases are commonplace in business environments. Small businesses routinely use database management systems (DBMSs) that are resident on a personal computer to keep track of such things as inventory or customer lists. For these applications, small scale commercially available DBMSs are available that operate on personal computers. Examples of these DBMSs include Access ® from Microsoft, Inc. and Paradox ® from Borland, Inc. Typically, these smaller DBMSs are adequate in the small business environment where relatively few users access the data. In these cases, the speed at which data can be obtained from the DBMS is adequate. Moreover, because access to the personal computer that runs the DBMS can be adequately controlled, the data stored in the DBMS is relatively secure.

However, for large businesses that have a very large DBMS, access speed and security of the data is an important concern. For example, for large financial institutions that keep extensive financial information on hundreds of thousands of people, and where hundreds of users may be attempting to access the data simultaneously, access speed may be less than satisfactory. Additionally, for a large DBMS that has thousands of "dumb terminals" in often unsecured environments, data security is an important concern. For example, a bank may maintain sensitive financial information with regard to millions of separate accounts and/or customers. This information should only be available to users of the DBMS on a "need to know" basis.

Furthermore, it is often the case that different categories of users may require different types of information contained in the database. For example, one category of user, such as a bank teller, may require account balance information on a customer. Alternatively, a loan officer may require information with regard to the credit worthiness of the customer. Thus, only certain categories of users should be allowed to access certain types of information contained in the DBMS.

SUMMARY OF THE INVENTION

The present invention provides for the interactive generation of a plurality of query packages stored at a host DBMS. Generation of the query packages is limited only to those users that have authorization to do so. Typically, only the database administrator of the DBMS has this authorization. The query packages includes one or more pre-compiled procedures. Each procedure is a single SQL statement that has been pre-compiled. Each query package also has associated therewith an authorization table that enumerates each individual user, or category of user, that can invoke any procedure within the query package. By formulating a plurality of query packages, each package being tailored to a particular category of user, security of the data on the DBMS is enhanced. Further, invoking pre-compiled SQL statements stored in packages significantly reduces access time. Moreover, the database administrator and users can interactively generate and use the query packages in a user friendly environment.

In accordance with other aspects of the present invention, the host DBMS is a distributed database architecture (DRDA) compliant DBMS that stores the query packages. The query packages are formulated on a work station by the database administrator via a series of commands sent to the DRDA compliant DBMS.

In accordance with other aspects of the present invention, the authorization tables for each query package are stored at the host DBMS.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
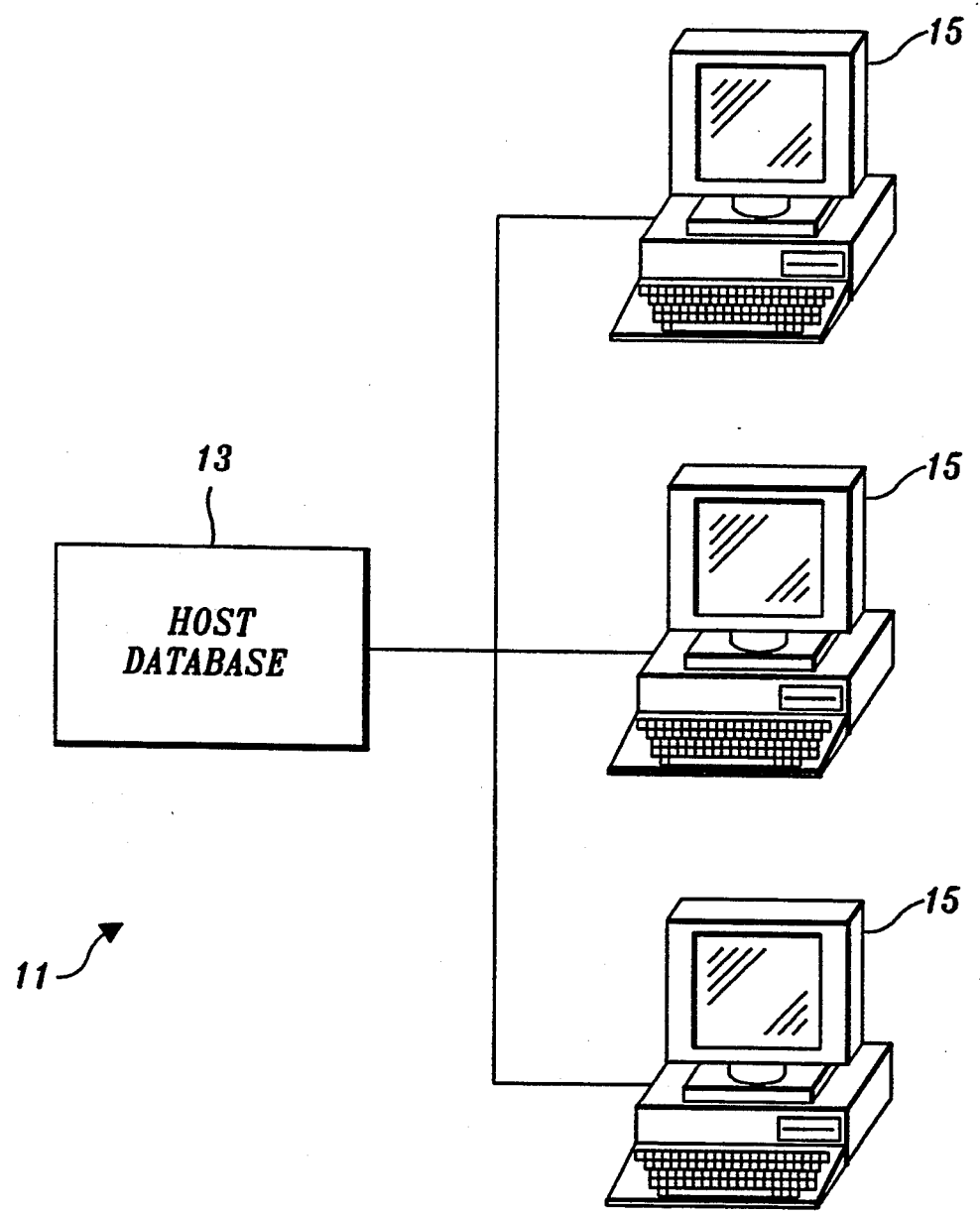
FIG. 1 is a schematic diagram of a database management system resident on a host mainframe computer with various user work stations networked thereto.

FIG. 1 is a schematic diagram of a typical large scale database management system (DBMS) 11 that includes a mainframe computer 13 and several user work stations 15. The mainframe 13 is for example an IBM 3090. Alternatively, the mainframe 13 may be replaced by a mini-computer, such as a AS/400 computer. The work stations 15 are stand alone personal computers that are networked to access mainframe 13. In the preferred embodiment, the user work stations 15 are IBM-compatible personal computers that have a variety of applications software running thereon, such as Excel ®, Lotus 1-2-3 ®, or Microsoft Word ®. As will be further described below, it is not uncommon that users of the applications software may need access to the data stored on the DBMS resident on mainframe 13. Further, although only three user work stations 15 are shown in FIG. 1, it can be appreciated that in large DBMSs, hundreds or thousands of user work stations 15 are networked with mainframe 13. Indeed, as will be shown in greater detail below, the present invention provides the greatest advantage over the prior art in larger DBMSs.

Mainframe 13 is also referred to as the host computer and is the repository for the data that are stored on the DBMS resident thereon. For example, mainframe 13 may have the well-known DB/2 brand DBMS installed. Access to the data contained in the mainframe 13 is typically accomplished by commands issued by a user operating the user work stations 15. As noted above, user work stations 15 are typically personal computers running local applications programs. It is also likely that the user work stations 15 are running local host access software, such as RUMBA ® from Wall Data, Inc. Generally, most applications software that have the capability of importing data from a remote host DBMS do so on the basis of a standardized command language and syntax. As is known to those skilled in the art, the well known structured query language (SQL), or slight modifications thereof, is now the de facto standard. SQL is a set of commands and syntactic rules for accessing and modifying the data in a DBMS. For further information with regard to SQL, the reader is directed to "A Guide to the SQL Standard," C. J. Date, Addison-Wesley (2d Ed. 1989).

The present invention allows the user work stations 15 to access quickly the data stored on the DBMS resident on mainframe 13, as well as providing enhanced security. In summary, the present invention provides for generation of a plurality of query packages that are stored by the DBMS resident at mainframe 13. Generation of the query packages is limited only to those users that have authorization, typically only the database administrator of the DBMS. As is known in the art, the database administrator is the individual responsible for the overall maintenance and operation of the DBMS. The query packages include a plurality of procedures. Each procedure is a single SQL statement that has been pre-compiled. A pre-compiled SQL statement is also referred to as a "static" statement. Although the term query package is used, the packages can contain any SQL statement, not only "query" type statements such as SELECT. Further, each query package has associated therewith an authorization table that enumerates each individual user, or category of user, that can invoke any procedure within the query package. The authorization tables for the query packages are also stored at the DBMS resident on mainframe 13. By formulating a plurality of query packages, each package tailored to a particular category of user, security of the data on the DBMS is enhanced. Further, by having static statements that are pre-compiled, access time to the data on the DBMS is significantly reduced. Moreover, the database administrator and users can interactively generate and use the query packages in a user friendly environment. Previously, in order to generate pre-compiled statements, complex segments of source code, typically written in a third generation language, such as COBOL or PL/I, would have to be written and installed at the mainframe 13.

In the preferred embodiment, one of the user work stations 15 is a secure work station that is designated as a work station for use by the database administrator. Only the database administrator has access to the work station, and thus, only the database administrator can formulate new query packages or modify an existing query package. Alternatively, the database administrator may access any of the work stations 15 by "logging on" to the DBMS under the database administrator's user identification and password. Thus, it can be appreciated that numerous methods of only allowing the database administrator to create or modify query packages are available.

Figure 2:
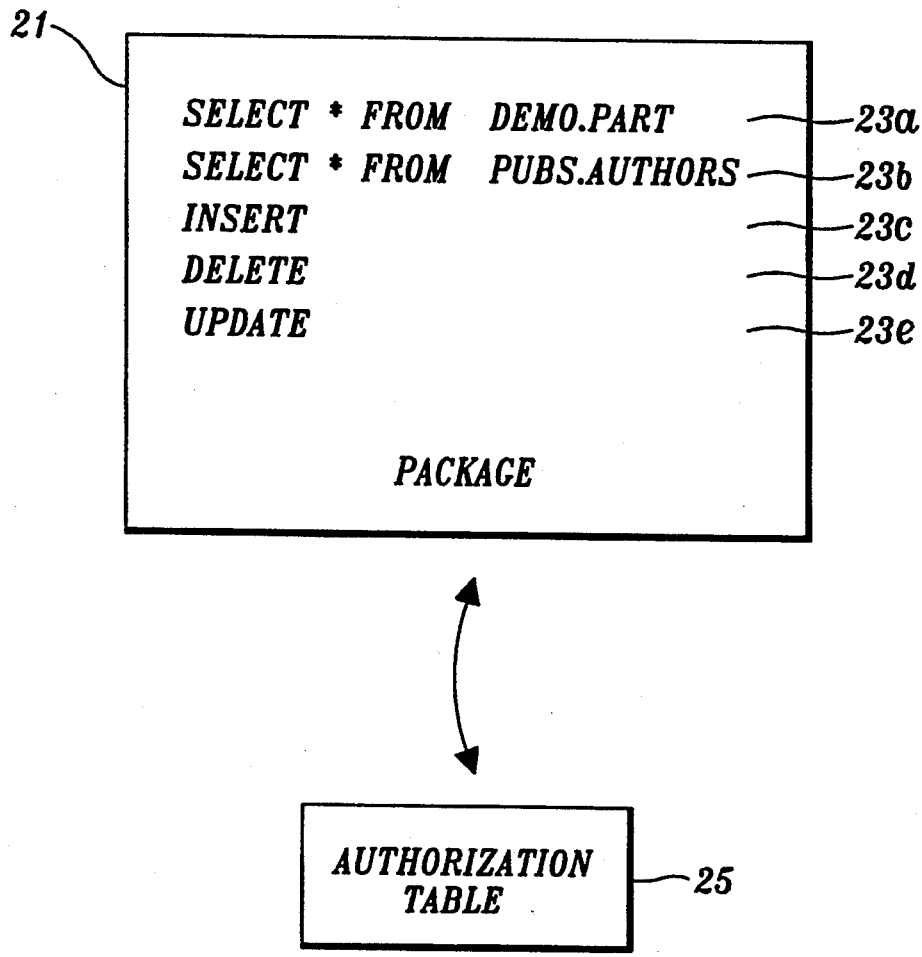
FIG. 2 is a schematic diagram illustrating the structure of a query package.

Turning next to FIG. 2, an example query package 21 is schematically illustrated. As noted above, each individual SQL statement within the package is referred to as a procedure 23a-e. A query package may include tens or even hundreds of separate procedures depending upon the application. Each of the procedures 23a-e, such as procedure 23a, is an SQL statement that performs a predefined action on a predefined portion of the database. In the particular example shown in FIG. 2, query package 21 includes five procedures 23a-e. Procedures 23a-b is an SQL statement that uses the SQL command of SELECT. The remaining procedures 23c-e invoke the INSERT, DELETE, and UPDATE commands respectively in SQL. Although the procedures shown in FIG. 2 are in their SQL format, as noted above, the procedures 23a-e are pre-compiled static statements.

To enhance the security of the data on the DBMS, each query package 21 also has associated with it an authorization table 25. The authorization table 25 is a listing of those users, or predefined category of users, of the database that are entitled to access the procedures 23a-e set forth in the query package 21. The authorization tables for the query packages are stored at the DBMS resident the mainframe 13. By providing authorization tables, groups of procedures can be logically grouped into a query package. For example, in a financial institution, the loan officers may have authorization to a query package that includes a series of procedures, all of which relate to information probative on the credit worthiness of an individual. In contrast, bank tellers may have access to a query package that contain a series of procedures, all of which relate to account balance information.

Figure 3:
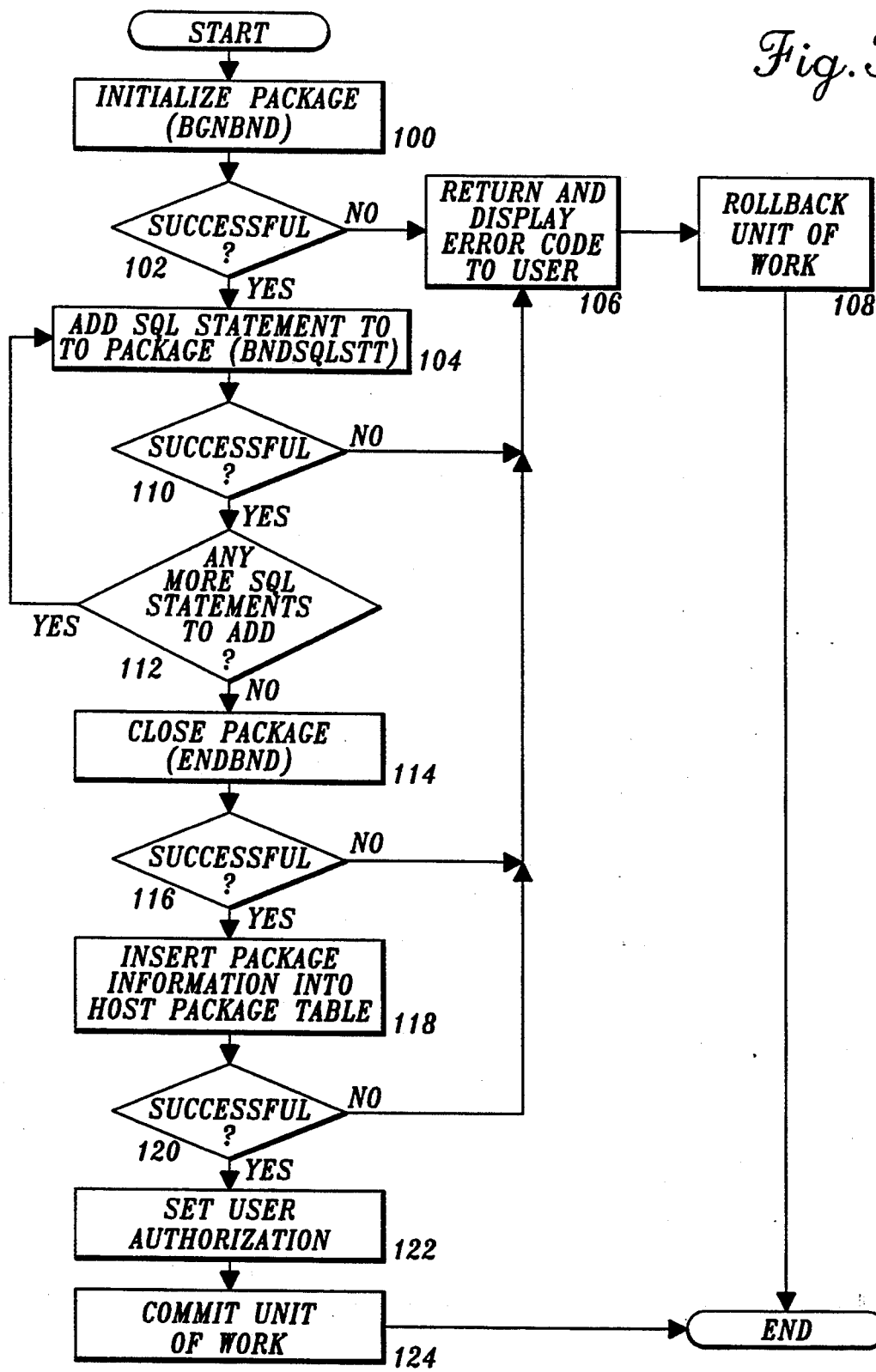
FIG. 3 is a flow diagram illustrating the method of generating a new query package by the database administrator.

As noted above, generation of a query package 21 is accomplished by the database administrator and the process is illustrated in FIG. 3. At box 100, a query package is initialized by the database administrator at a user work station 15. The step of initialization is accomplished by transmitting a BGNBND ("begin bind") command through the network to the host. The network, in the preferred embodiment, uses the advanced peer-to-peer communications (APPC) protocol. The BGNBND command is specific to distributed database architecture (DRDA) compliant DBMSs and instructs the DBMS to begin formation of a query package. A DRDA compliant DBMS complies with a standard that has been set forth by International Business Machines, Inc. For further information regarding DRDA databases, the reader is directed towards "Distributed Relational Database Architecture," IBM Reference Number SC26-4651-01, (2nd Ed. 1993). By sending the BGNBND command in box 100, a "unit of work" in the DBMS is initiated. As is known to those skilled in the art, a "unit of work" in a DRDA compliant DBMS is a sequence of commands that the DBMS treats as a single entity. In this manner, the DBMS can ensure that all commands are consistent prior to executing the commands. Thus, unless all of the commands, such as BGNBND, are correct syntactically and otherwise, none of the commands in the unit of work are executed. The further description of the present invention will be in the context of DRDA compliant DBMSs. It can be appreciated that for other types of DBMSs, differing commands are used to form the query packages.

After the BGNBND command has been received by the mainframe 13, the DRDA compliant DBMS resident on mainframe 13 replies with an SQLCARD data object. The SQLCARD data object indicates whether or not the BGNBND command has been executed successfully by the DBMS. Thus, at box 102, the SQLCARD data object is examined and if the contents of the SQLCARD data object indicate that the BGNBND command was successful, then at box 104, the database administrator may commence with adding procedures to the query package. In particular, the database administrator formulates an SQL statement that is to be added as a procedure to the query package. The SQL statement is transmitted over the APPC network to the DBMS resident on mainframe 13. With reference to FIG. 2, a sample SQL statement may be SELECT * FROM DEMO.PART.

However, if at box 102 the SQLCARD data object indicates that the BGNBND command was not successful, then at a box 106, the contents of the SQLCARD data object are displayed to the database administrator as an error code. Further, then at a box 108, the unit of work is rolled back by the database administrator, in effect scrapping the formation of the query package and beginning anew. If the BGNBND command was successful, then at box 104, the database administrator may transmit an SQL statement to the DBMS. The SQL statement received by the DBMS is then processed. In particular, the DBMS resident on mainframe 13 compiles the received SQL statement and associates it with the query package that has been formulated by the previous BGNBND command. Once compilation of the SQL statement and inclusion in the query package is completed, a SQLCARD data object is returned to the database administrator. Once again, the SQLCARD data object returned from mainframe 13 is examined at box 110. If the SQLCARD data object indicates that the SQL statement was added as a procedure to the package satisfactorily, then the database administrator has an option at box 112 to add further SQL statements to the query package. However, if the SQLCARD data object from the DBMS resident on mainframe 13 indicates that the addition of the previous SQL statement was unsuccessful, then an error code is displayed to the database administrator at box 106.

The process of adding SQL statements to the query package can repeat itself until multiple SQL statements have been added to the query package by repeating boxes 104, 110, and 112. After all of the desired SQL statements have been added to the query package, at box 114, a command is transmitted to the DBMS resident on mainframe 13 to close the query package. In particular, for DRDA compliant DBMSs, the command that closes a query package is ENDBND. The ENDBND command indicates to the DBMS resident on mainframe 13 that the query package is now complete.

Once again, an SQLCARD data object is returned by the DBMS. At box 116, the SQLCARD data object is examined to determine whether or not the ENDBND command was successfully executed. If unsuccessful, then at box 106, an error code is displayed to the database administrator. Further, at box 108, the unit of work initiated by the BGNBND command earlier is rolled back, in effect canceling all of the commands subsequent to and including the BGNBND command. However, if the ENDBND command was successful, then at box 118, query package identification and query package parameters are stored in a package table maintained by the DBMS resident at the mainframe 13. In addition, the same information is stored at the user work station 15 used by the database administrator to form the query package. As will be further described below, the package table allows users of the DBMS to access the query packages and the multiple procedures contained therein.

For example, the package table contains information on each query package such as the query package ID, a description of the contents of the query package, memory locations where each procedure within each query package may be found within the memory or other permanent storage of mainframe 13, as well as other parameters. Following insertion into the package tables, a SQLCARD data object is transmitted back to the database administrator. At box 120, the SQLCARD data object is examined for any error messages. If there are error messages, then at box 106, the error message is displayed, and, at box 108, the unit of work is rolled back.

If, however, the insertion of the parameter information on the newly formed query package into the package table at the mainframe 13 and at the user work station 15 is successful as indicated by the SQLCARD data object, then at box 122, the user authorization for the query package must be set by the database administrator. The database administrator can choose among any of the multiple users of the database that can access the particular package that has just been formed. For example, the database administrator may review various categories of users of the users of the database and add each desired category to an authorization table associated with that particular query package. The authorization table maintained by the DBMS is typically stored on mainframe 13.

After the database administrator has set forth the authorization table for the query package, next, at a box 124, the unit of work is committed. As will be apparent to those familiar with DRDA databases, committing a unit of work completes the query package and the query package is ready for execution.

Figure 4A:
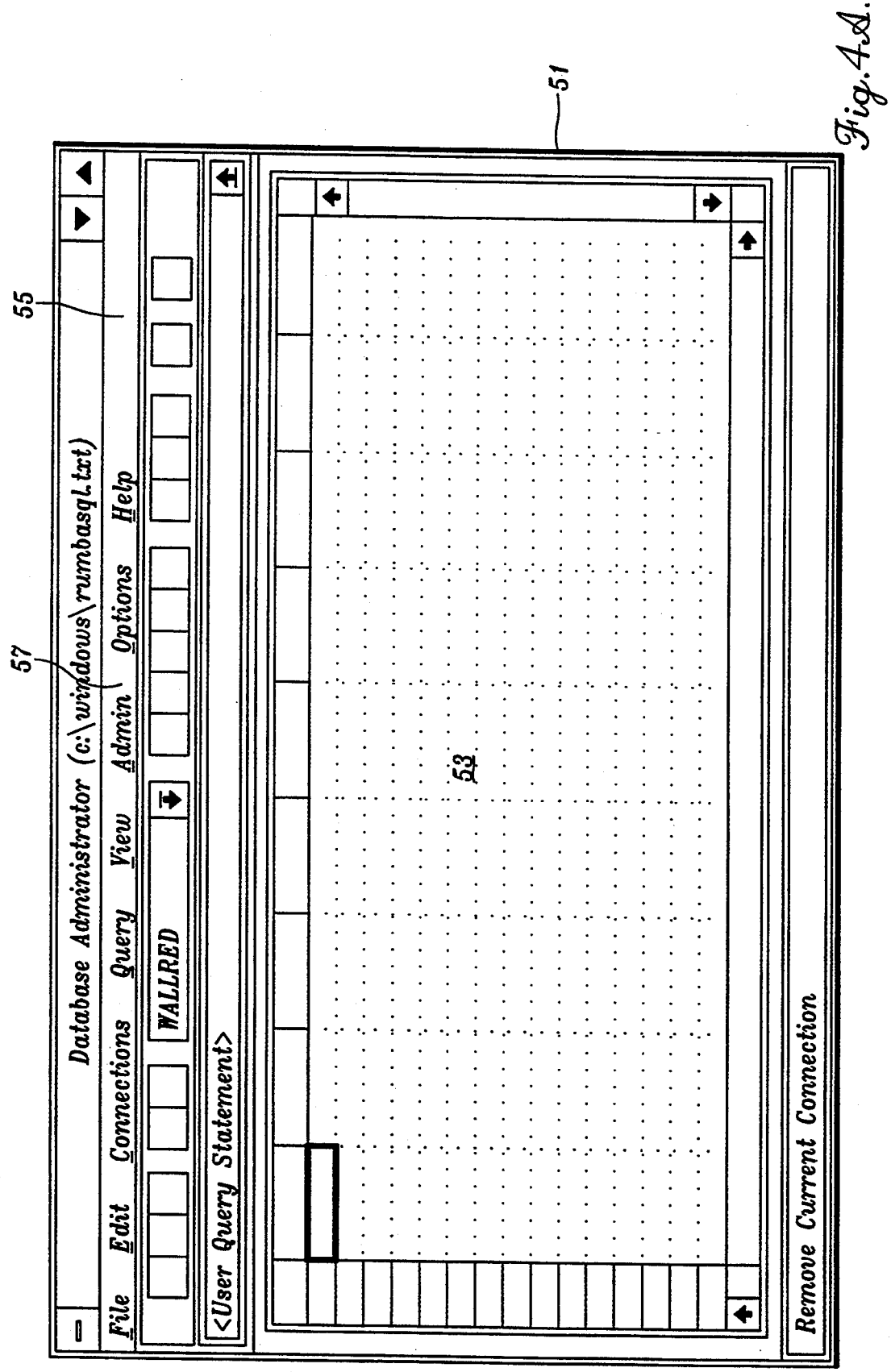
FIGS. 4A-4B are screen displays seen by the database administrator while forming a query package.
Figure 4B:
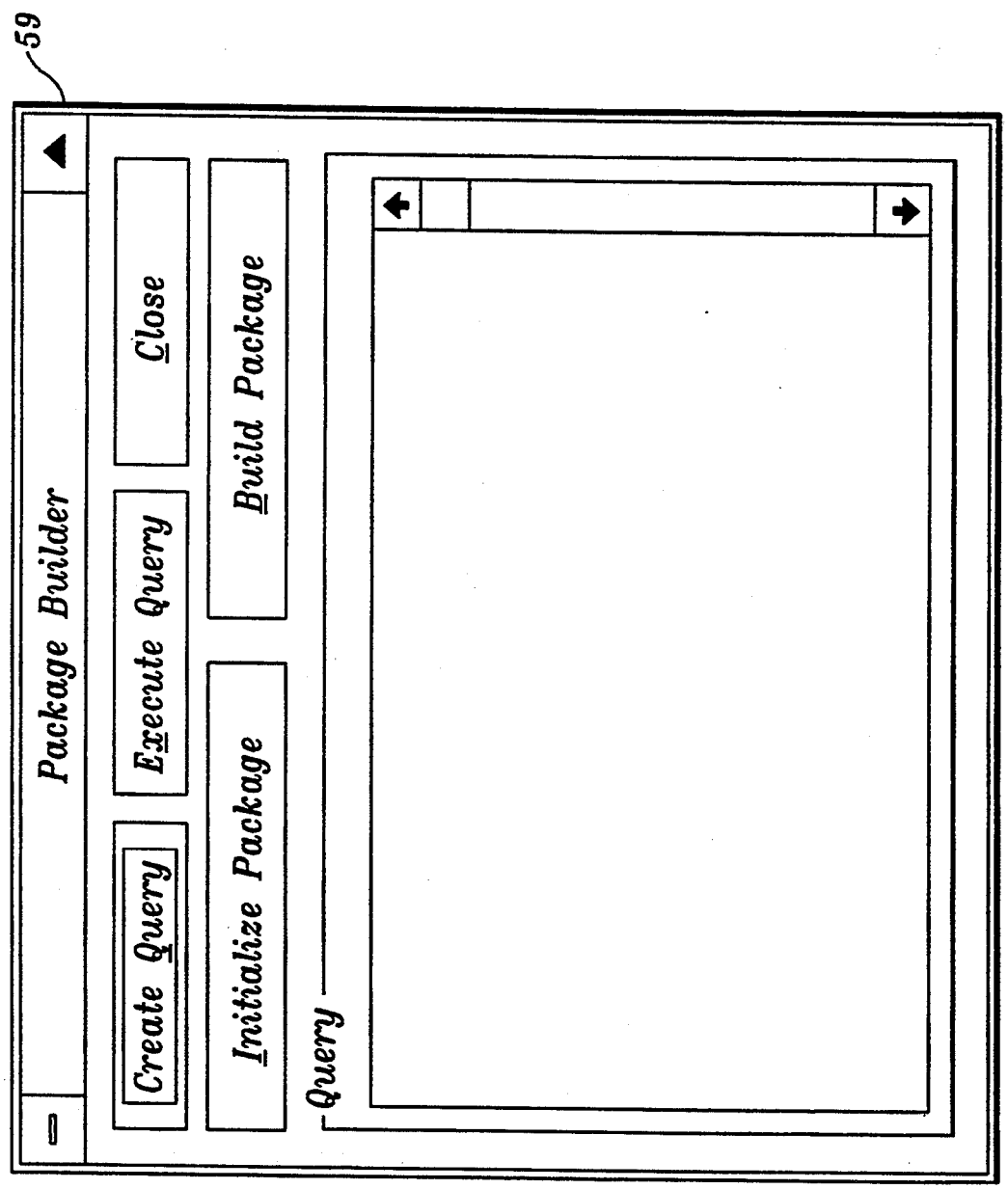

To further illustrate the creation of a query package, reference is made to FIGS. 4A-4B and 5A-5C which illustrate screen displays seen by the database administrator during generation of a query package. In particular, in FIG. 4A, a window 51 is seen by the database administrator. The main portion of the window 51 is a conventional database grid 53. At a top menu bar 55, a pull-down menu labeled "Admin" 57 is seen. The Admin menu 57 includes a selection that is entitled "Package Creation." When this option is selected, the sequence of steps set forth in FIG. 3 may be executed by the database administrator. After the "Package Creation" option is chosen, a "Package Builder" dialog box 59 is displayed, as seen in FIG. 4B. At this stage, the database administrator depresses the "Initialize Package" button. The depressing of this button (typically by the use of a mouse pointer) transmits the BGNBND command to the DBMS resident on mainframe 13.

Figure 5A:
FIGS. 5A-5C are screen displays seen by the database administrator while forming a query package.
Figure 5B:
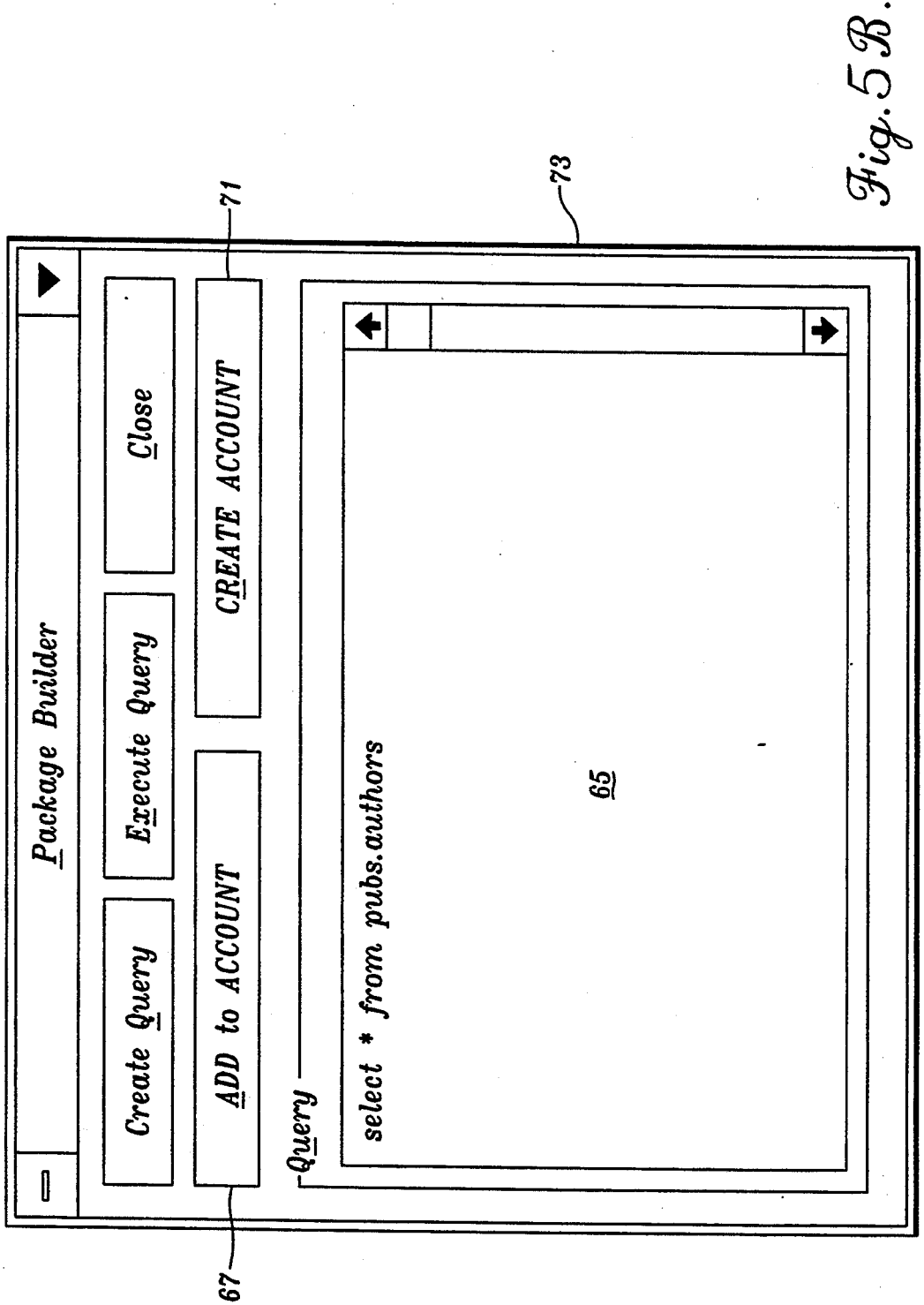

If the SQLCARD data object indicates that the BGNBND command has been successful, then, turning to FIG. 5A, the "Initialize Package" dialog box 61 appears. In the preferred embodiment, the database administrator enters a package name in the location provided in the dialog box 61. In the example shown in FIG. 5A, the package name is "ACCOUNT" The package name provides a name by which other users of the DBMS can access and refer to the query package. Furthermore, a package description can also be entered which is, in common terms, a description of the procedures contained in the query package. In the example shown in FIG. 5A, the package description is "All Procedures for the Accounting Dept." Once this identifying information has been entered into the dialog box 61, the done button 63 of the dialog box 61 is depressed. The database administrator will return to a "Package Builder" dialog box 73, as seen in FIG. 5B. The new "Package Builder" dialog box 73 is identical to the "Package Builder" dialog box 59 except that the "Initialize Package" button has changed to "ADD to ACCOUNT". The button has changed to include the name of the new query package, in this case: "ACCOUNT". If the name of the new query package were "TestPkg," then the button would read "ADD to TestPkg."

Figure 5C:
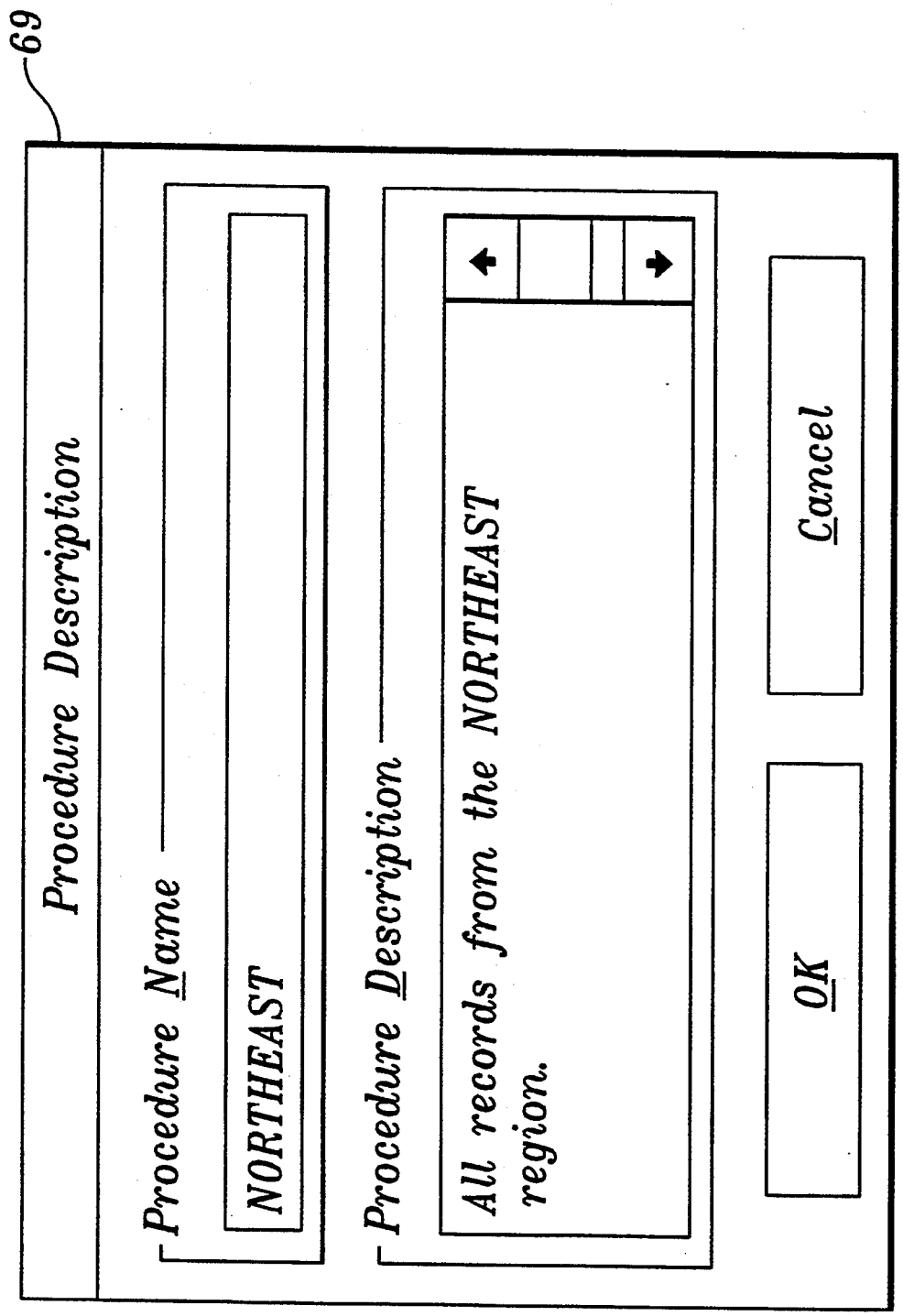

Next, the database administrator can input SQL statements that are to be added to the query package by typing the SQL statements into the "Query" box 65. For example, the database administrator may enter a SQL statement such as "SELECT * FROM PUBS.AUTHORS". After the SQL statement has been entered, by depressing the "ADD to ACCOUNT" button 67, a new dialog box appears. The new dialog box entitled "Procedure Description" is shown in FIG. 5C as dialog box 69. At this point, a name for the newly entered SQL statement (as a procedure) in the query package can be provided. In this example, the name of the new procedure is "NORTHEAST" and the description of the procedure is "All records from the NORTHEAST region." After the database administrator has included all of the SQL statements that are to be added as procedures to the query package, at the "Package Builder" dialog box 59, the "Create ACCOUNT" button 71 is depressed. Depression of this button executes further steps in the process illustrated in FIG. 3, namely boxes 114–120.

Figure 6:
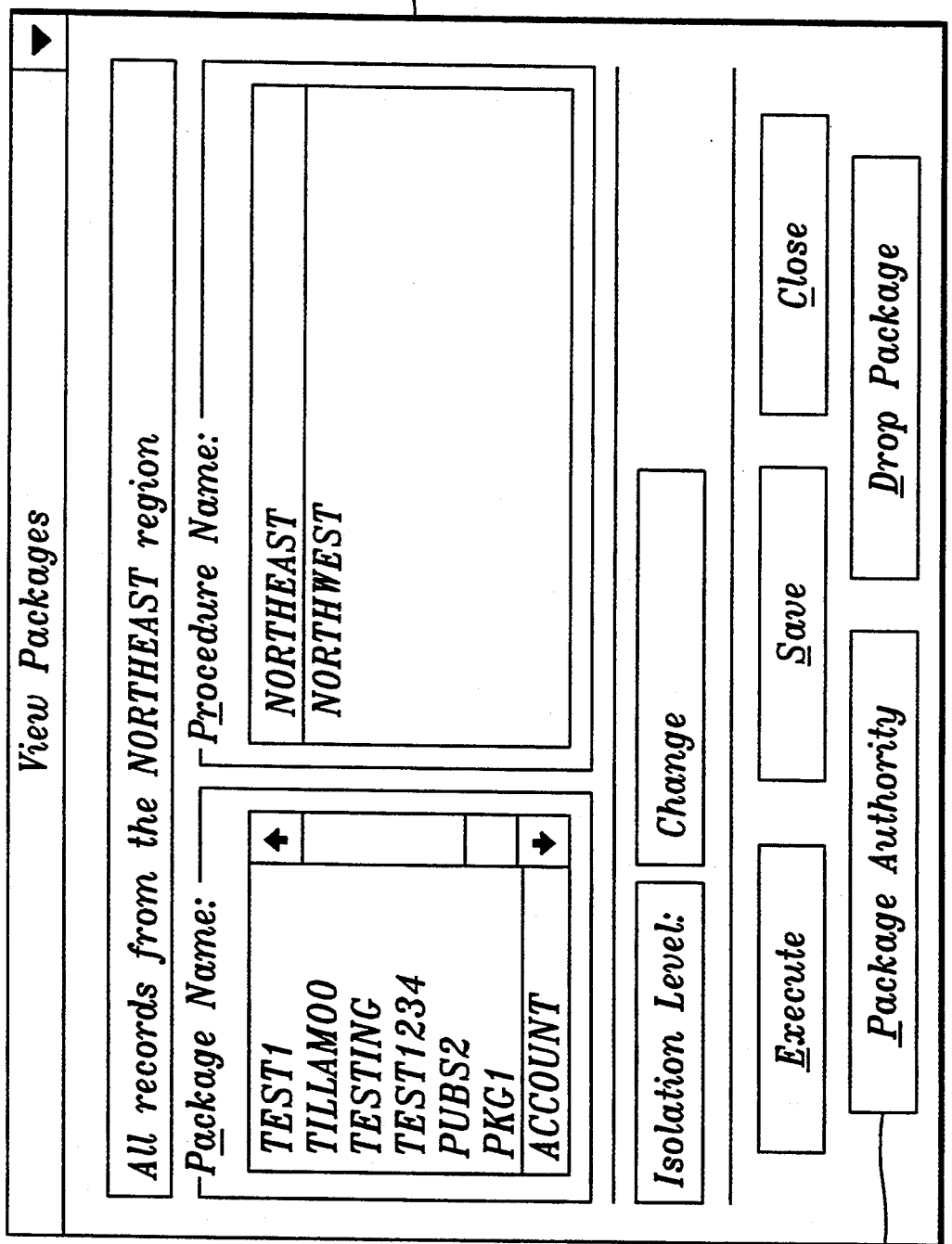
FIG. 6 is a screen display seen by a user that is executing a procedure within a query package.

Next, the user authorization of the query package must be provided. If there is no explicit user authorization, all users of the DBMS are authorized to use the procedures set forth in the newly created query package. However, if selective authorization is desired, then as seen in FIG. 3 at box 122, the database administrator may do so. In particular, returning to FIG. 4 and window 51, the database administrator moves to the "View" pull-down menu and chooses an option entitled "View Packages." When that option is activated, a dialog box 77 as seen in FIG. 6 appears. The "View Packages" dialog box 77 includes a listing of all of the query packages that have been created, a listing of each of the procedures contained in the query package that is highlighted, and a description of the procedure that is highlighted. In the example shown in FIG. 6, the query package named "ACCOUNT" has a procedure named "NORTHEAST" which provides "All records from the NORTHEAST region."

Figure 7:
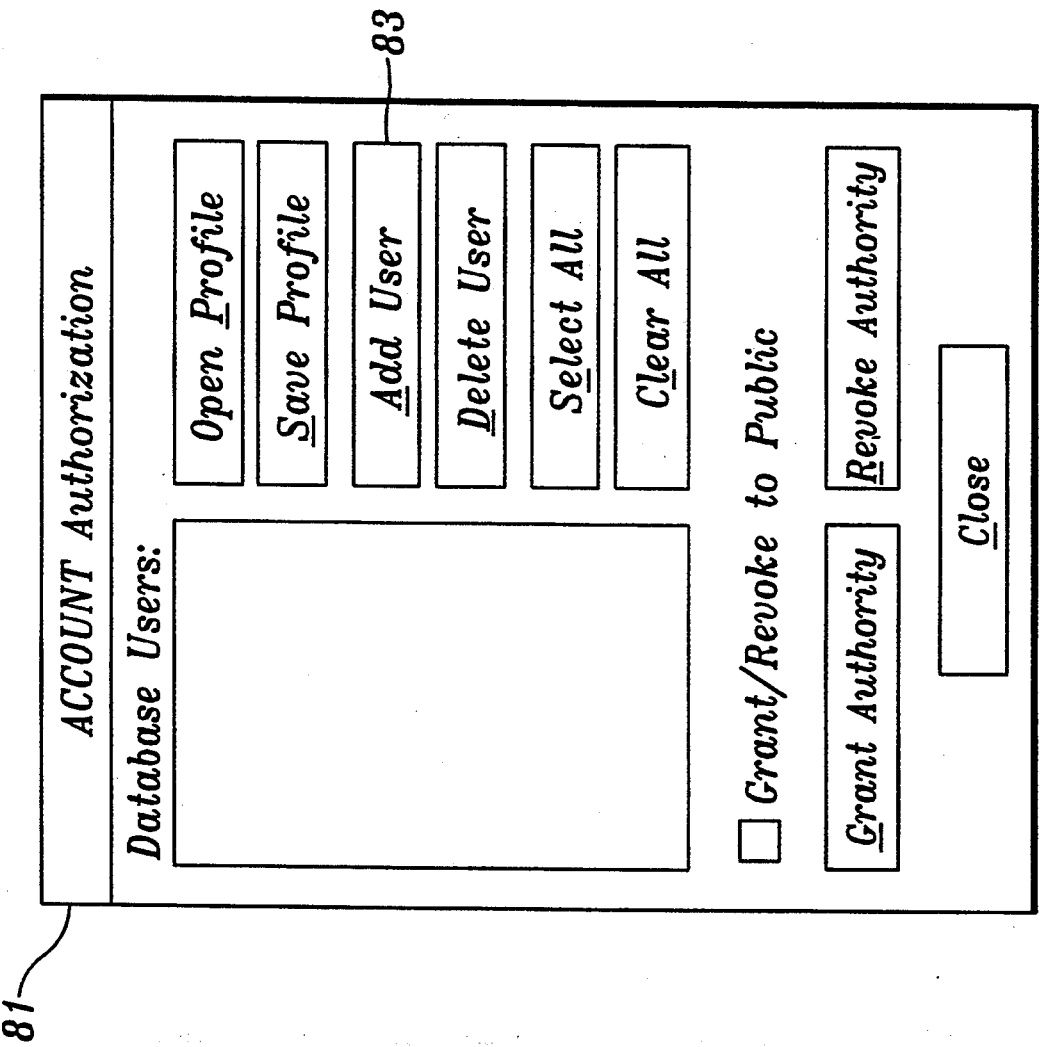
FIG. 7 is a screen display seen by the database administrator while granting user authorization to a query package.

In order to grant or change the user authority for execution of the package, the "Package Authority" button 79 is depressed. Upon depression, turning to FIG. 7, an "ACCOUNT Authorization" dialog box 81 appears. It can be appreciated that the dialog box 81 is named "ACCOUNT Authorization" because the new query package is named "ACCOUNT" and that for other query package names, other names for the dialog box 81 are constructed. The left-hand side of the dialog box 81 is a listing of the users of the DBMS. Although none are shown in this particular example, in the preferred embodiment, the database users may include individual user names for the DBMS, or alternatively, categories of different database users. To add authorized users to the query package, particular database users are highlighted and the "Add User" button 83 is depressed. This process is repeated until all desired user authorizations are granted. Each time the "Add User" button 83 is depressed, the database administrator at work station 15 causes a signal to be sent to the DBMS on mainframe 13 that adds the highlighted user to an authorization table that is associated with the query package. This authorization table is stored in the form of a file at the mainframe 13.

In the manner described above, the database administrator is provided with an interactive tool to create query packages containing multiple SQL statements. These SQL statements are pre-compiled and are stored by the DBMS resident at mainframe 13. The precompilation of the SQL statements provides a significant speed advantage. For example, in the prior art, users wishing to access the DBMS resident at mainframe 13 had to transmit to the DBMS an SQL statement. The SQL statement was received at the mainframe and compiled and executed. The results from the execution of the SQL statement were returned to the user. However, after each individual SQL statement compiled and executed, the compiled version of the SQL statement was discarded. Thus, multiple users executing the same SQL statement would require the mainframe 13 to recompile the individual SQL statement. This often resulted in an unacceptable response time from the DBMS resident at mainframe 13. As provided for in the present invention, the plurality of query packages, each having a plurality of pre-compiled procedures, is provided. Thus, access to the data in the DBMS resident at mainframe 13 is substantially simplified and accelerated.

Figure 8:
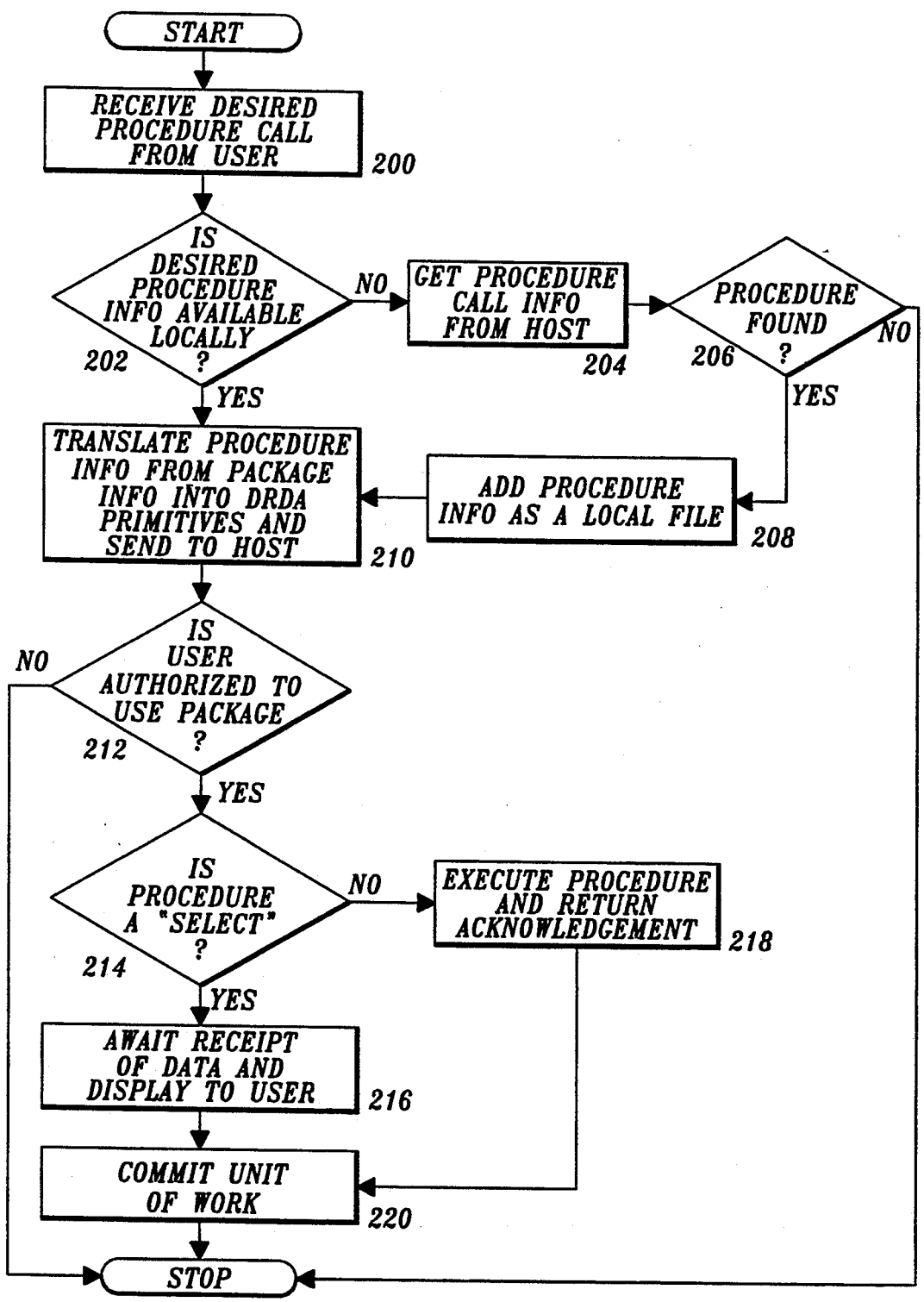
FIG. 8 is a flow diagram illustrating the method of executing a query package.

In order for a user of the DBMS to execute a procedure in a query package, the steps illustrated in FIG. 8 are performed. In operation, a user at a user work station 15 views a display screen that is substantially similar to the window 51 shown in FIG. 4. However, one important distinction is that for a user of the DBMS, the "Admin" menu 57 is omitted. Thus, unlike the database administrator, a user cannot create packages nor grant and revoke authority to packages. In executing a procedure in a query package, the user chooses the "View Packages" option of the "View" pull-down menu. Next, the "View Packages" dialog box 77 shown in FIG. 6 is displayed. However, because the user is not a database administrator, the "Package Authority" button 79 is omitted. The user can scroll through the query package listings to determine the specific query package that the user wishes to display. The procedures contained in the package are displayed in the "Procedure" box and the user can select which procedure to be executed.

After the procedure has been selected, the execute button 87 is depressed. After depression of this button, the method shown in FIG. 8 is executed by the user work station 15. In particular, at a box 200, the procedure that is to be executed is input by the user to the work station 15 and received by the work station 15. Next, a check is made as to whether or not certain parameter information for the chosen procedure is available in the local package table. Recall that each user work station 15 contains a package table that includes parameter information. Typically, the local package table is stored as a file in the memory of the work station 15. As each query package is accessed by a work station 15, the local package table is continually updated with parameter information related to the query package accessed. The parameter information is transmitted to the DBMS resident at mainframe 13 in order to invoke a particular procedure. However, for new user work stations 15, or for newly created query packages, local package tables may not have the requisite parameter information. Thus, at a box 202, a determination is made as to whether or not parameter information for the chosen procedure is located in the package table. If not, then at box 204, the parameter information is retrieved from the DBMS resident at mainframe 13 using standard APPC protocol.

Next, at box 206, if the parameter information for the chosen procedure is not found at the DBMS for one reason or another, then the execution of the procedure terminates and an error message is returned to the user. However, if the parameter information for the chosen procedure is found, then at box 208, the parameter information is added to the local package table at the local user work station 15. Next, at box 210, the parameter information is translated into DRDA primitives and sent to the DBMS resident at mainframe 13.

At box 212, after the mainframe 13 receives the parameter information from the work station 15, a determination is made by the DBMS resident on mainframe 13 as to whether or not the user is authorized to execute procedures within that query package. This is accomplished by checking the list of users that have been granted authorization, as stored in the authorization table associated with that particular query package. If the user is not authorized to execute any procedures within the query package, then the procedure is stopped and the user receives an error message.

If, however, the user is authorized to execute the procedure contained within the package, then at a box 214, a determination is made as to whether or not the procedure involves a SQL "SELECT" command. If a SELECT command is provided in the procedure, then at box 216, the DBMS resident at mainframe 13 executes the command and returns the requested data and displays the data to the user. If, however, some other SQL command other than select is provided in the procedure (such as INSERT, DELETE, or UPDATE), then the procedure is executed at box 218 and an acknowledgment is returned to the user. In either event, at box 220, the unit of work is committed and the procedural call is complete.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of improving the efficiency of a database system, said database system including a database management system (DBMS) resident on a host computer, said DBMS communicatively linked to a plurality of work stations, said DBMS storing information that may be accessed via said work stations, said method including the steps of:
   (a) forming at least one query package, said query package including a plurality of procedures, said procedures being pre-compiled static statements that when executed by the DBMS manipulate said information stored in said DBMS; and
   (b) associating with each said query package an authorization table, said authorization table enumerating a predetermined set of users that have access to said query package, said predetermined set of users of said query package being able to perform an invocation of said procedures of said query package via said work stations and being able to manipulate said information stored in said DBMS.

2. The method of claim 1, wherein the step of forming said query package is done by a database administrator interactively using one of said work stations, and further includes the steps of:
   (a) initiating said query package by transmitting a BGNBND command from said work station to said DBMS;
   (b) transmitting at least one structured query language (SQL) command to said DBMS;
   (c) said DBMS receiving said SQL command and compiling said command into said pre-compiled static statement;
   (d) associating said pre-compiled static statement with said query package; and
   (e) completing said query package by transmitting a ENDBND command from said work station to said DBMS.

3. The method of claim 2, wherein the communications between said work stations and said DBMS is via the advanced peer-to-peer protocol (APPC).

4. The method of claim 2, further including the steps of:
   (a) formulating parameter information on said query package, said parameter information uniquely identifying said query package and including information necessary for the invocation of said procedures in said query package; and
   (b) wherein after one of said predetermined set of users invokes said procedure of said query package via said work station, forming a local package table at said work station, said local package table including said parameter information.

5. The method of claim 2, wherein said authorization table associated with said query package is formed by a database administrator interactively using one of said work stations by:
   (a) transmitting to said DBMS said predetermined set of users that are authorized to invoke said query package;
   (b) including said predetermined set of users into said authorization table;
   (c) storing said authorization table as an authorization file; and
   (d) associating said authorization file with said query package.

6. The method of claim 1, further including the steps of:
   (a) formulating parameter information on said query package, said parameter information uniquely identifying said query package and including information necessary for the invocation of said procedures in said query package; and
   (b) wherein after one of said predetermined set of users invokes said procedure of said query package via said work station, forming a local package table at said work station, said local package table including said parameter information.

7. The method of claim 1, wherein said authorization table associated with said query package is formed by a database administrator interactively using one of said work stations by:
   (a) transmitting to said DBMS said predetermined set of users that are authorized to invoke said query package;

(b) including said predetermined set of users into said authorization table;

(c) storing said authorization table as an authorization file; and (d) associating said authorization file with said query package.

8. The method of claim 1, wherein said DBMS is a distributed relational database architecture (DRDA) compliant DBMS.

9. An improved database system comprising:
(a) a database management system (DBMS) resident of a host computer, said DBMS operative to store information;
(b) a plurality of user work stations, said user work stations communicatively linked to said DBMS, said user work stations being able to access and manipulate said stored information on said DBMS;
(c) a database administrator work station, said database administrator work station being able to interactively communicate with said DBMS to form a query package that is stored by said DBMS, said query package including a plurality of procedures, said procedures being pre-compiled static statements that when executed by the DBMS manipulate said information stored in said DBMS, said database administrator work station also being able to interactively communicate with said DBMS to form an authorization table associated with said query package, said authorization table enumerating a predetermined set of users that have access to said query package, said predetermined set of users set forth in said authorization table of said query package being able to invoke said procedures of said query package and being able to manipulate said information stored in said DBMS.

10. The apparatus of claim 9, wherein said DBMS is a distributed relational database architecture (DRDA) compliant DBMS.

11. The apparatus of claim 10, wherein said host computer is a mainframe computer.

* * * * *